United States Patent
Park et al.

(10) Patent No.: US 11,377,547 B2
(45) Date of Patent: Jul. 5, 2022

(54) THERMOPLASTIC RESIN COMPOSITION

(71) Applicant: LG CHEM, LTD., Seoul (KR)

(72) Inventors: Chun Ho Park, Daejeon (KR); Yong Yeon Hwang, Daejeon (KR); Da Eun Sung, Daejeon (KR); Yong Hee An, Daejeon (KR); Jeong Min Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/055,088

(22) PCT Filed: Nov. 12, 2019

(86) PCT No.: PCT/KR2019/015347
§ 371 (c)(1),
(2) Date: Nov. 12, 2020

(87) PCT Pub. No.: WO2020/101326
PCT Pub. Date: May 22, 2020

(65) Prior Publication Data
US 2021/0214544 A1 Jul. 15, 2021

(30) Foreign Application Priority Data

Nov. 13, 2018 (KR) .................. 10-2018-0139153
Nov. 8, 2019 (KR) .................. 10-2019-0142395

(51) Int. Cl.
*C08L 51/00* (2006.01)
(52) U.S. Cl.
CPC ....... *C08L 51/003* (2013.01); *C08L 2205/025* (2013.01); *C08L 2205/035* (2013.01)
(58) Field of Classification Search
CPC ..... C08L 51/04; C08L 33/12; C08L 2205/025
See application file for complete search history.

(56) References Cited

U.S. PATENT DOCUMENTS

| 2003/0162895 A1 | 8/2003 | Gaggar et al. |
| 2006/0065363 A1 | 3/2006 | Dhawan et al. |
| 2016/0002455 A1 | 1/2016 | Chung et al. |
| 2016/0185959 A1 | 6/2016 | Kim et al. |
| 2017/0088704 A1 | 3/2017 | Park |
| 2017/0121519 A1* | 5/2017 | Park ............... C08L 51/003 |
| 2017/0183455 A1 | 6/2017 | Yoo et al. |
| 2021/0221996 A1 | 7/2021 | Jo et al. |

FOREIGN PATENT DOCUMENTS

| EP | 3778767 A1 | 2/2021 |
| JP | S63254154 A | 10/1988 |
| JP | 2006509048 A | 3/2006 |
| JP | 2008514466 A | 5/2008 |
| JP | 2015522084 A | 8/2015 |
| KR | 10-2012-0051156 A | 5/2012 |
| KR | 10-2012-0072972 A | 7/2012 |
| KR | 10-2014-0005510 A | 1/2014 |
| KR | 10-1644752 B1 | 8/2016 |
| KR | 10-1654722 B1 | 9/2016 |
| KR | 10-2018-0075743 A | 7/2018 |
| KR | 10-2019-0052798 A | 5/2019 |
| KR | 10-2019-0064989 A | 6/2019 |

OTHER PUBLICATIONS

Extended European Search Report for EP Application No. 19883421.0, dated Jul. 16, 2021.

* cited by examiner

Primary Examiner — Jeffrey C Mullis

(57) ABSTRACT

Provided is a thermoplastic resin composition which includes: a graft copolymer prepared by graft-polymerizing an aromatic vinyl-based monomer and a vinyl cyan-based monomer onto an acrylic rubber polymer; a first matrix copolymer including a $C_1$-$C_3$ alkyl (meth)acrylate-based monomer unit, an aromatic vinyl-based monomer unit and a vinyl cyan-based monomer unit; a second matrix copolymer including a $C_1$-$C_3$ alkyl (meth)acrylate-based monomer unit, an aromatic vinyl-based monomer unit and a vinyl cyan-based monomer unit; and an additive including a polymer including a $C_1$-$C_3$ alkyl (meth)acrylate-based monomer unit, wherein the first matrix copolymer and the second matrix copolymer have different weight-average molecular weights, specifically, a thermoplastic resin composition which allows high gloss, high hardness, high weather resistance and reduced whitening to be realized.

13 Claims, No Drawings

THERMOPLASTIC RESIN COMPOSITION

CROSS-REFERENCE TO RELATED APPLICATION

The present application is a National Phase entry of International Application No. PCT/KR2019/015347, which claims priority to and the benefit of Korean Patent Application No. 10-2018-0139153, filed on Nov. 13, 2018, and Korean Patent Application No. 10-2019-0142395, filed on Nov. 8, 2019, the disclosures of which are incorporated herein by reference in their entirety.

TECHNICAL FIELD

The present invention relates to a thermoplastic resin composition, and more particularly, to a thermoplastic resin composition which has improved properties in terms of elongation, weather resistance, surface gloss, appearance quality, scratch resistance and a whitening phenomenon.

BACKGROUND ART

In conventional paint coating processes that include curing, harmful substances such as volatile organic compounds are released into the atmosphere, causing environmental pollution, and thus, legal regulations are being strengthened worldwide.

For this reason, as an outer plate material for home appliances, a polymer-coated metal (PCM) is generally used at present for the purpose of preventing corrosion, reducing friction, and providing surface gloss. Particularly among PCMs, the use of a vinyl-coated metal (VCM), which includes a vinyl resin coating, is increasing in line with the demand for high end final products. A VCM is a material that includes a galvanized steel plate and PVC and PET film coatings applied thereon, and is used as an outer plate material for home appliances. Further, a VCM can be used for building materials, furniture, automobiles, electrical materials, roof tiles and the like.

While various coating materials for VCMs are currently being developed, since the PVC and PET film coatings applied to an outer plate material have poor weather resistance, an acrylonitrile-styrene-acrylate (ASA) graft copolymer having excellent weather resistance can be an alternative. In such ASA graft copolymers, an acryl-based rubber polymer is mainly used as a core for improving impact resistance, and styrene, acrylonitrile, methyl methacrylate and the like are used as a shell for improving colorability and the dispersibility in a matrix copolymer.

For application to a VCM, an ASA graft copolymer should have high elongation to prevent tearing during press forming of the sheet metal and be able to exhibit excellent surface quality even when processed at high temperature.

Therefore, efforts have been continuously made to develop a thermoplastic resin composition that includes an ASA graft copolymer having high elongation and not generating bubbles even when processed at high temperature.

DISCLOSURE

Technical Problem

The present invention is directed to providing a thermoplastic resin composition having improved properties in terms of elongation, weather resistance, surface gloss, appearance quality, scratch resistance and a whitening phenomenon while maintaining basic properties such as impact resistance, hardness and the like.

Technical Solution

In the present invention, there is provided a thermoplastic resin composition which includes: a graft copolymer prepared by graft-polymerizing an aromatic vinyl-based monomer and a vinyl cyan-based monomer onto an acrylic rubber polymer; a first matrix copolymer including a $C_1$-$C_3$ alkyl (meth)acrylate-based monomer unit, an aromatic vinyl-based monomer unit and a vinyl cyan-based monomer unit; a second matrix copolymer including a $C_1$-$C_3$ alkyl (meth)acrylate-based monomer unit, an aromatic vinyl-based monomer unit and a vinyl cyan-based monomer unit; and an additive including a polymer including a $C_1$-$C_3$ alkyl (meth)acrylate-based monomer unit, wherein the first matrix copolymer and the second matrix copolymer have different weight-average molecular weights.

Advantageous Effects

The thermoplastic resin composition of the present invention can exhibit significantly improved properties in terms of elongation, weather resistance, surface gloss, appearance quality, scratch resistance and a whitening phenomenon while having excellent basic properties such as impact resistance, hardness and the like.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, the average particle diameters of a seed, a core, an acrylic rubber polymer and a graft copolymer may be measured by a dynamic light scattering method, more specifically using a Nicomp 380 HPL instrument manufactured by Particle Sizing Systems.

In the present specification, an average particle diameter refers to an arithmetic average particle diameter in the particle size distribution as measured by a dynamic light scattering method, specifically, an average particle diameter in the scattering intensity distribution.

In the present invention, a degree of grafting for a graft copolymer may be calculated by the following equation.

Degree of grafting(%): Weight of grafted monomers (g)/Weight of rubber polymer (g)×100

Weight of grafted monomers (g): Weight of insoluble material (gel) obtained after 1 g of graft copolymer is dissolved in 30 g of acetone and centrifuged Weight of rubber polymer (g): Theoretical weight of $C_4$-$C_{10}$ alkyl (meth)acrylate-based monomer in graft copolymer powder, or weight of $C_4$-$C_{10}$ alkyl (meth)acrylate-based monomer added in preparation of graft copolymer In the present invention, the weight-average molecular weight of a shell of a graft copolymer may refer to the weight-average molecular weight of a copolymer which includes an aromatic vinyl-based monomer unit and a vinyl cyan-based monomer unit that are graft-polymerized onto an acrylic rubber polymer.

In the present invention, the weight-average molecular weight of a shell of a graft copolymer may be measured as a relative value with respect to a standard polystyrene (PS) sample by gel permeation chromatography after dissolving, in a tetrahydrofuran (THF) solution, the portion (sol) that has been dissolved in acetone for measuring a degree of grafting.

In the present invention, the weight-average molecular weights of a first matrix copolymer and a second matrix copolymer may be measured as a relative value with respect to a standard poly(methyl methacrylate) sample (manufactured by Polymer Laboratories Ltd.) by gel permeation chromatography, using THF as an eluent.

In the present invention, the polymerization conversion rates of a first matrix copolymer and a second matrix copolymer may be calculated by the following equation.

Polymerization conversion rate(%)={(Weight of solid content of actually obtained copolymer)/(Weight of prescriptively added monomers)}×100

In the present invention, the weight-average molecular weight of a polymer included in an additive may be measured as a relative value with respect to a standard poly(methyl methacrylate) sample (manufactured by Polymer Laboratories Ltd.) by gel permeation chromatography, using THF as an eluent.

In the present invention, the polymerization conversion rate of a polymer included in an additive may be determined by extracting residual monomer components from the polymer by a reprecipitation method using chloroform ($CHCl_3$) and methanol and then quantitatively analyzing the same using a gas chromatography-mass spectrometry (GC-MSD).

In the present invention, "polymer" should be understood as encompassing both a homopolymer which is formed by polymerizing one type of monomer and a copolymer which is formed by polymerizing two or more types of monomers.

In the present invention, an aromatic vinyl-based monomer unit may be a unit derived from an aromatic vinyl-based monomer, and the aromatic vinyl-based monomer may be one or more selected from the group consisting of styrene, α-methylstyrene, p-methylstyrene and 2,4-dimethylstyrene, and is preferably styrene.

In the present invention, a vinyl cyan-based monomer unit may be a unit derived from a vinyl cyan-based monomer, and the vinyl cyan-based monomer may be one or more selected from the group consisting of acrylonitrile, methacrylonitrile and ethacrylonitrile, and is preferably acrylonitrile.

In the present invention, a $C_1$-$C_3$ alkyl (meth)acrylate-based monomer unit may be a unit derived from a $C_1$-$C_3$ alkyl (meth)acrylate-based monomer, and the $C_1$-$C_3$ alkyl (meth)acrylate-based monomer may be one or more selected from the group consisting of methyl (meth)acrylate, ethyl (meth)acrylate and propyl (meth)acrylate, and is preferably one or more selected from the group consisting of methyl methacrylate and methyl acrylate.

1. Thermoplastic Resin Composition

The thermoplastic resin composition according to one embodiment of the present invention includes: 1) a graft copolymer prepared by graft-polymerizing an aromatic vinyl-based monomer and a vinyl cyan-based monomer onto an acrylic rubber polymer; 2) a first matrix copolymer including a $C_1$-$C_3$ alkyl (meth)acrylate-based monomer unit, an aromatic vinyl-based monomer unit and a vinyl cyan-based monomer unit; 3) a second matrix copolymer including a $C_1$-$C_3$ alkyl (meth)acrylate-based monomer unit, an aromatic vinyl-based monomer unit and a vinyl cyan-based monomer unit; and 4) an additive including a polymer including a $C_1$-$C_3$ alkyl (meth)acrylate-based monomer unit, wherein the 2) first matrix copolymer and the 3) second matrix copolymer have different weight-average molecular weights.

Hereinafter, each component of the thermoplastic resin composition according to one embodiment of the present invention will be described in detail.

1) Graft Copolymer

The graft copolymer is prepared by graft-polymerizing an aromatic vinyl-based monomer and a vinyl cyan-based monomer onto an acrylic rubber polymer.

The graft copolymer may serve to improve the weather resistance, elongation, colorability, chemical resistance, processability, surface gloss characteristics and whitening properties of the thermoplastic resin composition.

The acrylic rubber polymer may have an average particle diameter of 40.0 to 400.0 nm, 50.0 to 320.0 nm or 65.0 to 310.0 nm, preferably 65.0 to 310.0 nm. When the above-described range is satisfied, a graft copolymer having excellent weather resistance and excellent impact resistance can be provided.

Meanwhile, in order to significantly improve the weather resistance, colorability, chemical resistance, appearance quality, elongation and whitening properties of the graft copolymer, the acrylic rubber polymer may have an average particle diameter of 40.0 to 100.0 nm, 50.0 to 90.0 nm or 65.0 to 75.0 nm, preferably 65.0 to 75.0 nm. Specifically, in this case, the weather resistance of the acrylic rubber polymer can be improved because a specific surface area increases as an average particle diameter decreases. In addition, since the acrylic rubber polymer allows visible light to pass therethrough, colorability can be significantly improved. In addition, since a large amount of the graft copolymer can be uniformly dispersed in the thermoplastic resin composition, elongation and whitening properties can be significantly improved.

In addition, in order to significantly improve the impact resistance, chemical resistance and appearance quality of the graft copolymer, the acrylic rubber polymer may have an average particle diameter of 150.0 to 400.0 nm, 230.0 to 320.0 nm or 250.0 to 310.0 nm, preferably 250.0 to 310.0 nm.

The graft copolymer may be a copolymer prepared by graft-polymerizing styrene and acrylonitrile onto a butyl acrylate rubber polymer.

The graft copolymer may have a degree of grafting of 25 to 50% or 30 to 45%, preferably 30 to 45%. When the above-described range is satisfied, not only can the compatibility thereof with the matrix copolymers be significantly improved due to the aromatic vinyl-based monomer unit and the vinyl cyan-based monomer unit graft-polymerized onto the acrylic rubber polymer, but also the elongation, whitening properties and impact resistance of the thermoplastic resin composition can be significantly improved.

The graft copolymer may have a shell having a weight-average molecular weight of 30,000 to 200,000 g/mol, 50,000 to 180,000 g/mol or 50,000 to 150,000 g/mol, preferably 80,000 to 150,000 g/mol. When the above-described range is satisfied, the compatibility thereof with the matrix copolymers can be improved, and the dispersibility of the graft copolymer, specifically the acrylic rubber polymer, in the thermoplastic resin composition can be improved.

Meanwhile, the graft copolymer may be prepared by forming a seed by adding one or more selected from the group consisting of a $C_4$-$C_{10}$ alkyl (meth)acrylate-based monomer, an aromatic vinyl-based monomer and a vinyl cyan-based monomer and carrying out crosslinking, forming a core in the presence of the seed by adding a $C_4$-$C_{10}$ alkyl (meth)acrylate-based monomer and carrying out crosslinking, and forming a shell in the presence of the core by adding an aromatic vinyl-based monomer and a vinyl cyan-based monomer and carrying out graft-polymerization.

Here, the core may refer to the above-described acrylic rubber polymer.

The $C_4$-$C_{10}$ alkyl (meth)acrylate-based monomer may be one or more selected from the group consisting of butyl (meth)acrylate, pentyl (meth)acrylate, hexyl (meth)acrylate, heptyl (meth)acrylate, octyl (meth)acrylate, ethylhexyl (meth)acrylate, nonyl (meth)acrylate, isononyl (meth)acrylate and decyl (meth)acrylate, and is preferably butyl acrylate.

The $C_4$-$C_{10}$ alkyl (meth)acrylate-based monomer may be added in an amount of 30 to 50 wt % or 35 to 45 wt %, preferably 35 to 45 wt %, based on the total weight of the monomers added in the preparation of the graft copolymer. When the above-described range is satisfied, the weather resistance, impact resistance, surface gloss characteristics, elongation and whitening properties of the graft copolymer can be improved.

The aromatic vinyl-based monomer may be added in an amount of 30 to 50 wt % or 35 to 45 wt %, preferably 35 to 45 wt %, based on the total weight of the monomers added in the preparation of the graft copolymer. When the above-described range is satisfied, not only can the processability of the graft copolymer be improved, but also the graft copolymer can be more uniformly dispersed in the thermoplastic resin composition, and the colorability of the thermoplastic resin composition can be improved.

The vinyl cyan-based monomer may be added in an amount of 10 to 30 wt % or 15 to 25 wt %, preferably 15 to 25 wt %, based on the total weight of the monomers added in the preparation of the graft copolymer. When the above-described range is satisfied, not only can the chemical resistance of the graft copolymer be improved, but also the graft copolymer can be more uniformly dispersed in the thermoplastic resin composition, and the colorability of the thermoplastic resin composition can be improved.

The total weight of the monomers added in the preparation of the seed may be 1 to 20 wt % or 5 to 15 wt %, preferably 5 to 15 wt %, based on the total weight of the monomers added in the preparation of the graft copolymer.

The total weight of the monomers added in the preparation of the core may be 20 to 50 wt % or 25 to 45 wt %, preferably 25 to 45 wt %, based on the total weight of the monomers added in the preparation of the graft copolymer.

The total weight of the monomers added in the preparation of the shell may be 40 to 70 wt % or 45 to 65 wt %, preferably 45 to 65 wt %, based on the total weight of the monomers added in the preparation of the graft copolymer.

The graft copolymer may be included in an amount of 30 to 90 parts by weight or 35 to 85 parts by weight, preferably 35 to 85 parts by weight, with respect to 100 parts by weight of the sum of the graft copolymer, the first matrix copolymer and the second matrix copolymer. When the above-described range is satisfied, the elongation, weather resistance, chemical resistance, colorability, processability, surface gloss characteristics and whitening properties of the thermoplastic resin composition can be significantly improved.

2) First Matrix Copolymer

The first matrix copolymer includes a $C_1$-$C_3$ alkyl (meth)acrylate-based monomer unit, an aromatic vinyl-based monomer unit and a vinyl cyan-based monomer unit.

The first matrix copolymer may allow the colorability, weather resistance and hardness of the thermoplastic resin composition to be improved.

Meanwhile, the first matrix copolymer has a different weight-average molecular weight from the second matrix copolymer to be described below. In addition, since there is a difference in weight-average molecular weight between the first matrix copolymer and the second matrix copolymer, the elongation of the thermoplastic resin composition can be significantly improved.

The difference in weight-average molecular weight between the first matrix copolymer and the second matrix copolymer may be 50,000 to 150,000 g/mol, 70,000 to 130,000 g/mol or 90,000 to 110,000 g/mol, preferably 90,000 to 110,000 g/mol. When the above-described range is satisfied, the elongation of the thermoplastic resin composition can be significantly improved.

The first matrix copolymer may have a weight-average molecular weight of 160,000 to 240,000 g/mol, 170,000 to 230,000 g/mol or 180,000 to 220,000 g/mol, preferably 180,000 to 220,000 g/mol. When the above-described range is satisfied, the colorability, weather resistance and hardness of the thermoplastic resin composition can be significantly improved.

Meanwhile, the first matrix copolymer may be a copolymer prepared using a monomer mixture including a $C_1$-$C_3$ alkyl (meth)acrylate-based monomer, an aromatic vinyl-based monomer and a vinyl cyan-based monomer.

The monomer mixture may include the $C_1$-$C_3$ alkyl (meth)acrylate-based monomer in an amount of 60 to 90 wt % or 65 to 85 wt %, preferably 65 to 85 wt %. When the above-described range is satisfied, the colorability, weather resistance and hardness of the thermoplastic resin composition can be improved.

The monomer mixture may include the aromatic vinyl-based monomer in an amount of 8 to 32 wt % or 10 to 25 wt %, preferably 10 to 25 wt %. When the above-described range is satisfied, the processability of the thermoplastic resin composition can be improved.

The monomer mixture may include the vinyl cyan-based monomer in an amount of 2 to 12 wt % or 1 to 10 wt %, preferably 1 to 10 wt %, based on the total weight of the first matrix copolymer. When the above-described range is satisfied, the chemical resistance of the thermoplastic resin composition can be improved.

The first matrix copolymer may be a copolymer of methyl methacrylate, styrene and acrylonitrile.

The first matrix copolymer may be included in an amount of 1 to 65 parts by weight or 5 to 60 parts by weight, preferably 5 to 60 parts by weight, with respect to 100 parts by weight of the sum of the graft copolymer, the first matrix copolymer and the second matrix copolymer. When the above-described range is satisfied, the colorability, weather resistance and hardness of the thermoplastic resin composition can be significantly improved.

Meanwhile, the thermoplastic resin composition may include the first matrix copolymer and the second matrix copolymer in a weight ratio of 55:45 to 95:5 or 60:40 to 90:10, preferably 60:40 to 90:10. When the above-described range is satisfied, the elongation, a whitening phenomenon, scratch resistance and appearance characteristics of the thermoplastic resin composition can be improved.

3) Second Matrix Copolymer

The second matrix copolymer includes a $C_1$-$C_3$ alkyl (meth)acrylate-based monomer unit, an aromatic vinyl-based monomer unit and a vinyl cyan-based monomer unit.

The second matrix copolymer may allow the colorability, weather resistance and hardness of the thermoplastic resin composition to be improved.

The second matrix copolymer may have a weight-average molecular weight of 60,000 to 140,000 g/mol, 70,000 to 130,000 g/mol or 80,000 to 120,000 g/mol, preferably 80,000 to 120,000 g/mol.

When the above-described range is satisfied, the colorability, weather resistance and hardness of the thermoplastic resin composition can be significantly improved.

Meanwhile, the second matrix copolymer may be a copolymer prepared using a monomer mixture including a $C_1$-$C_3$ alkyl (meth)acrylate-based monomer, an aromatic vinyl-based monomer and a vinyl cyan-based monomer.

The monomer mixture may include the $C_1$-$C_3$ alkyl (meth)acrylate-based monomer in an amount of 60 to 90 wt % or 65 to 85 wt %, preferably 65 to 85 wt %. When the above-described range is satisfied, the colorability, weather resistance and hardness of the thermoplastic resin composition can be improved.

The monomer mixture may include the aromatic vinyl-based monomer in an amount of 8 to 32 wt % or 10 to 25 wt %, preferably 10 to 25 wt %. When the above-described range is satisfied, the processability of the thermoplastic resin composition can be improved.

The monomer mixture may include the vinyl cyan-based monomer in an amount of 2 to 12 wt % or 1 to 10 wt %, preferably 1 to 10 wt %. When the above-described range is satisfied, the chemical resistance of the thermoplastic resin composition can be improved.

The second matrix copolymer may be a copolymer of methyl methacrylate, styrene and acrylonitrile.

The second matrix copolymer may be included in an amount of 1 to 25 parts by weight or 2 to 20 parts by weight, preferably 2 to 20 parts by weight, with respect to 100 parts by weight of the sum of the graft copolymer, the first matrix copolymer and the second matrix copolymer. When the above-described range is satisfied, the colorability, weather resistance and hardness of the thermoplastic resin composition can be significantly improved.

4) Additive

The additive includes a polymer including a $C_1$-$C_3$ alkyl (meth)acrylate-based monomer unit.

The additive may allow the hardness, surface gloss, scratch resistance and appearance quality of the thermoplastic resin composition to be improved.

The polymer may have a weight-average molecular weight of 30,000 to 90,000 g/mol, 40,000 to 80,000 g/mol or 50,000 to 70,000 g/mol, preferably 50,000 to 70,000 g/mol. When the above-described range is satisfied, the compatibility with the graft copolymer, the first matrix copolymer and the second matrix copolymer is improved, such that the surface gloss and scratch resistance of the thermoplastic resin composition can be improved.

The polymer may be poly(methyl methacrylate).

For the purpose of improving processability, surface gloss and hardness, the polymer may be a copolymer that includes two or more types of $C_1$-$C_3$ alkyl (meth)acrylate-based monomer units, and is preferably a copolymer that includes a $C_1$-$C_3$ alkyl methacrylate-based monomer unit and a $C_1$-$C_3$ alkyl acrylate-based monomer unit. The copolymer may be a copolymer prepared using a monomer mixture including a $C_1$-$C_3$ alkyl methacrylate-based monomer and a $C_1$-$C_3$ alkyl acrylate-based monomer. In this case, the monomer mixture may include the $C_1$-$C_3$ alkyl methacrylate-based monomer and the $C_1$-$C_3$ alkyl acrylate-based monomer in a weight ratio of 90:10 to 99:1 or 92:8 to 97:3, preferably 92:8 to 97:3. When the above-described range is satisfied, processability, fluidity and optical properties can be excellent.

The copolymer may be a copolymer of methyl methacrylate and methyl acrylate.

The additive may further include an antioxidant.

The antioxidant may be one or more selected from the group consisting of tris(2,4-di-t-butylphenyl)phosphite, tris(nonylphenyl)phosphate and pentaerythritol tetrakis(3-(3,5-di-tert-butyl-4-hydroxyphenyl)propionate, and is preferably tris(2,4-di-t-butylphenyl)phosphite. The antioxidant may be included in an amount of 0.01 to 1 part by weight or 0.1 to 0.5 part by weight, preferably 0.1 to 0.5 part by weight, with respect to 100 parts by weight of the polymer. When the above-described range is satisfied, weather resistance can be improved.

The additive may be added in an amount of 0.1 to 5.0 parts by weight or 1.0 to 3.0 parts by weight, preferably 1.0 to 3.0 parts by weight, with respect to 100 parts by weight of the sum of the graft copolymer, the first matrix copolymer and the second matrix copolymer. When the above-described range is satisfied, the hardness, surface gloss, scratch resistance and appearance quality of the thermoplastic resin composition can be significantly improved.

Hereinafter, exemplary embodiments of the present invention will be described in detail so that those of ordinary skill in the art can easily carry out the present invention. However, it should be understood that the present invention can be implemented in various forms and that the exemplary embodiments are not intended to limit the present invention thereto.

Preparation Example 1

Formation of Seed

To a nitrogen-substituted reactor, 10 parts by weight of butyl acrylate, 0.04 part by weight of potassium persulfate as an initiator, 2 parts by weight of sodium di-2-ethylhexyl sulfosuccinate as an emulsifier, 0.02 part by weight of ethylene glycol dimethacrylate as a crosslinking agent, 0.04 part by weight of allyl methacrylate, 0.1 part by weight of $NaHCO_3$ as an electrolyte and 40 parts by weight of distilled water were batch-added. After raising the temperature to 65° C., polymerization was carried out for one hour and then terminated, and thereby a butyl acrylate rubber polymer (average particle diameter: 52.5 nm), which is a seed, was obtained.

Formation of Core

Polymerization was carried out while continuously adding each of the following to the seed-containing reactor at 70° C. for three hours at a constant rate: a mixture including 30 parts by weight of butyl acrylate, 0.5 part by weight of sodium di-2-ethylhexyl sulfosuccinate as an emulsifier, 0.2 part by weight of ethylene glycol dimethacrylate, 0.2 part by weight of allyl methacrylate, 0.1 part by weight of NaHCO$_3$ as an electrolyte and 20 parts by weight of distilled water; and 0.06 part by weight of potassium persulfate as an initiator. After the continuous addition was completed, the polymerization was continued for another hour and then terminated, and thereby a butyl acrylate rubber polymer (average particle diameter: 68.5 nm), which is a core, was obtained.

Preparation of Graft Copolymer

Polymerization was carried out while continuously adding each of the following to the core-containing reactor at 70° C. for five hours at a constant rate: a mixture including 40 parts by weight of styrene, 20 parts by weight of acrylonitrile, 1.4 parts by weight of potassium rosinate as an emulsifier, 0.042 part by weight of KOH as an electrolyte, 0.05 part by weight of t-dodecyl mercaptan as a molecular-weight regulator and 63 parts by weight of distilled water; and 0.1 part by weight of potassium persulfate as an initiator. After the continuous addition was completed, the polymerization was continued at 70° C. for another hour and then was terminated by lowering the temperature to 60° C., and thereby a graft copolymer latex (average particle diameter: 95.0 nm) was obtained. In this case, the graft copolymer latex had a polymerization conversion rate of 98%, a pH of 9.5 and a degree of grafting of 42%.

After 2 parts by weight of an aqueous calcium chloride solution (concentration: 10 wt %) was added to the graft copolymer latex, atmospheric coagulation at 85° C., aging at 95° C., dehydration and washing, and 30-minute drying with 90° C. hot air were carried out, and thereby a graft copolymer powder was obtained.

Preparation Example 2

Formation of Seed

To a nitrogen-substituted reactor, 7.5 parts by weight of styrene, 2.5 parts by weight of acrylonitrile, 0.2 part by weight of sodium di-2-ethylhexyl sulfosuccinate as an emulsifier, 0.04 part by weight of ethylene glycol dimethacrylate as a crosslinking agent, 0.04 part by weight of allyl methacrylate as a grafting agent, 0.2 part by weight of NaHCO$_3$ as an electrolyte and 40 parts by weight of distilled water were batch-added. After raising the temperature to 70° C., polymerization was initiated by batch-adding 0.05 part by weight of potassium persulfate. The polymerization was carried out at 70° C. for one hour and then terminated, and thereby a styrene-acrylonitrile rubber polymer (average particle diameter: 160.0 nm), which is a seed, was obtained.

Formation of Core

Polymerization was carried out while continuously adding, to the seed-containing reactor at 70° C. for three hours at a constant rate, a mixture including 40 parts by weight of butyl acrylate, 0.5 part by weight of sodium di-2-ethylhexyl sulfosuccinate as an emulsifier, 0.2 part by weight of ethylene glycol dimethacrylate as a crosslinking agent, 0.2 part by weight of allyl methacrylate as a grafting agent, 0.1 part by weight of NaHCO$_3$ as an electrolyte, 0.05 part by weight of potassium persulfate and 20 parts by weight of distilled water. After the continuous addition was completed, the polymerization was continued for another hour and then terminated, and thereby a butyl acrylate rubber polymer (average particle diameter: 280.0 nm), which is a core, was obtained.

Preparation of Graft Copolymer

Polymerization was carried out while continuously adding each of the following to the core-containing reactor at 70° C. for five hours at a constant rate: a mixture including 37.5 parts by weight of styrene, 12.5 parts by weight of acrylonitrile, 0.1 part by weight of potassium persulfate as an initiator, 1.5 parts by weight of potassium rosinate as an emulsifier, 0.05 part by weight of t-dodecyl mercaptan as a molecular-weight regulator and 63 parts by weight of distilled water; and 0.1 part by weight of potassium persulfate as an initiator. After the continuous addition was completed, the polymerization was continued at 75° C. for another hour and then was terminated by lowering the temperature to 60° C., and thereby a graft copolymer latex (average particle diameter: 350.0 nm) was obtained. In this case, the graft copolymer latex had a polymerization conversion rate of 98%, a pH of 9.5 and a degree of grafting of 38%.

After 2 parts by weight of an aqueous calcium chloride solution (concentration: 10 wt %) was added to the graft copolymer latex, atmospheric coagulation at 85° C., aging at 95° C., dehydration and washing, and 30-minute drying with 90° C. hot air were carried out, and thereby a graft copolymer powder was obtained.

Preparation Example 3

A first copolymer was prepared by carrying out polymerization at 140° C. while continuously adding, to a nitrogen-substituted 26-L first reactor at a rate of 12 L/hr for two hours, 80 parts by weight of methyl methacrylate, 15 parts by weight of styrene, 5 parts by weight of acrylonitrile, 25 parts by weight of toluene, 0.01 part by weight of 1,1-bis(t-butylperoxy)-3,3,5-trimethylcyclohexane as an initiator, 0.1 part by weight of 1,3,5-tris(4-t-butyl-3-hydroxy-2,6-dimethylbenzyl)-1,3,5-triazine-2,4,6-(1H,3H,5H)-trione as a sterically hindered phenolic antioxidant and 0.08 part by weight of n-dodecyl mercaptan as a molecular-weight regulator, and a second copolymer was prepared by carrying out polymerization at 150° C. while continuously adding the first copolymer to a nitrogen-substituted 26-L second reactor at a rate of 12 L/hr for two hours. In this case, the polymerization conversion rate was 72%. The obtained second copolymer was transferred to a volatilization tank where unreacted monomers and a reaction medium were removed at 215° C., and thereby a copolymer (weight-average molecular weight: 200,000 g/mol) in pellet form was obtained.

Preparation Example 4

A first copolymer was prepared by carrying out polymerization at 140° C. while continuously adding, to a nitrogen-substituted 26-L first reactor at a rate of 12 L/hr for two hours, 80 parts by weight of methyl methacrylate, 15 parts by weight of styrene, 5 parts by weight of acrylonitrile, 25 parts by weight of toluene, 0.01 part by weight of 1,1-bis(t-butylperoxy)-3,3,5-trimethylcyclohexane as an initiator, 0.1 part by weight of 1,3,5-tris(4-t-butyl-3-hydroxy-2,6-dimethylbenzyl)-1,3,5-triazine-2,4,6-(1H,3H,5H)-trione as a sterically hindered phenolic antioxidant and 0.08 part by weight of n-dodecyl mercaptan as a molecular-weight regulator, and a second copolymer was prepared by carrying out polymerization at 150° C. while continuously adding the first copolymer to a nitrogen-substituted 26-L second reactor at a rate of 12 L/hr for two hours. In this case, the polymerization conversion rate was 60%. The obtained second copolymer was transferred to a volatilization tank where unreacted monomers and a reaction medium were removed at 215° C., and thereby a copolymer (weight-average molecular weight: 100,000 g/mol) in pellet form was obtained.

Preparation Example 5

To a nitrogen-substituted reactor, 96 parts by weight of methyl methacrylate, 4 parts by weight of methyl acrylate, 0.2 part by weight of t-butylperoxy neodecanoate as an initiator, 133 parts by weight of distilled water, 0.82 part by weight of an aqueous saponification solution (concentration: 3 wt %) in which a methyl methacrylate-methacrylic acid copolymer has been hydrolyzed with NaOH as a suspending agent, 0.098 part by weight of sodium dihydrogen phosphate and 0.053 part by weight of disodium hydrogen phosphate as buffers, and 0.33 part by weight of n-octyl mercaptan as a molecular-weight regulator were batch-added. After raising the temperature to 60° C., polymerization was carried out for 120 minutes. After subsequently raising the temperature to 105° C. at a constant rate over 50 minutes, lauryl peroxide as an initiator was batch-added, and the polymerization was further carried out for 40 minutes and then terminated, and thereby a copolymer in bead form was obtained. In this case, the polymerization conversion rate was 99.95%.

The obtained copolymer was washed with 60° C. distilled water in a centrifugal separator and then dried while feeding, at a rate of 7.5 m³/hr, 120° C. air from which moisture, dust and the like have been removed through filtration.

The copolymer had a weight-average molecular weight of 60,000 g/mol and a polydispersity index of 1.7.

After mixing 100 parts by weight of the copolymer and 0.2 part by weight of tris(2,4-di-t-butylphenyl)phosphate as an antioxidant, the mixture was formed into pellets by carrying out extrusion in a 245° C. twin-screw extruder.

EXAMPLES AND COMPARATIVE EXAMPLES

The specifications of the components used in Examples and Comparative Examples are as follows:

(A) Graft Copolymer (A-1) Graft copolymer #1: The graft copolymer of Preparation Example 1 was used.
(A-2) Graft copolymer #2: The graft copolymer of Preparation Example 2 was used.

(B) Matrix Copolymer (B-1) First matrix copolymer: The copolymer of Preparation Example 3 was used.
(B-2) Second matrix copolymer: The copolymer of Preparation Example 4 was used.
(B-3) Third matrix copolymer: 92HR manufactured by LG Chem Ltd. was used.
(C) Additive: The pellet of Preparation Example 5 was used.

The above-described components were mixed in contents shown in Table 1 and Table 2 and stirred to prepare thermoplastic resin compositions.

Experimental Example 1

Test specimens were prepared by extruding and injection-molding the thermoplastic resin compositions of Examples and Comparative Examples. The properties of the test specimens were evaluated by the methods described below, and the results are shown in Table 1 and Table 2.

① Impact strength (kg·cm/cm): measured in accordance with ASTM 256.
② Hardness: measured in accordance with ASTM 785.
③ Elongation (%): measured in accordance with ASTM D638.
④ Weather resistance (ΔE): evaluated under SAE J1960 conditions for 3,000 hours using an accelerated weather resistance testing instrument (Ci4000 Weather-Ometer manufactured by ATLAS, xenon-arc lamp, quartz (inner)/S.Boro (outer) filter, irradiance 0.55 W/m² at 340 nm). In the following equation, ΔE is an arithmetic average value obtained before and after the accelerated weather resistance test, and values close to 0 indicate better weather resistance.

$$\Delta E = \sqrt{(L'-L_0)^2 + (a'-a_0)^2 + (b'-b_0)^2}$$

In the above equation, L', a' and b' are the L, a and b values measured in the CIE LAB color coordinate system after irradiating the test specimen with light under SAE J1960 conditions for 3,000 hours, and $L_0$, $a_0$ and $b_0$ are the L, a and b values measured in the CIE LAB color coordinate system before the light irradiation.

Experimental Example 2

After each of the thermoplastic resin compositions of Examples and Comparative Example was formed into a sheet having a width of 10 cm and a thickness of 0.2 mm using a sheet extruder, a test specimen was prepared by attaching, at 200° C., the sheet to a galvanized steel plate using an adhesive. The properties of the test specimen were evaluated by the methods described below, and the results are shown in Table 1 and Table 2.

Meanwhile, Comparative Example 2 yielded a test specimen that was obtained in a damaged state due to poor processing, and thus the properties thereof could not be evaluated.

⑤ Scratch resistance: evaluated in accordance with ASTM D3360, using a scratch resistance measuring instrument (QMESYS manufactured by QM450A).
  ○: HB or higher, x: B or lower
⑥ Whitening resistance: evaluated by dropping a 1 kg iron ball on the test specimen from a height of 1 m using a ball drop tester (FDI-01 manufactured by Labthink).
  ○: Whitening phenomenon did not occur, x: Whitening phenomenon occurred, or the sheet was torn or cracked
⑦ Surface gloss: measured in accordance with ASTM D523, at 60° using a gloss meter (VG 7000 manufactured by NIPPON DENSHOKU INDUSTRIES Co., LTD.)
⑧ Appearance quality: The appearance of the test specimen after being subjected to a bending press was visually evaluated.
  ○: There was no overall difference in gloss, and no surface curvature or lifting was present
  x: Gloss differed by position, and a local surface curvature and lifting/tearing were present

TABLE 1

| Classification | | Examples | | | | | |
|---|---|---|---|---|---|---|---|
| | | 1 | 2 | 3 | 4 | 5 | 6 |
| (A) Graft copolymer (parts by weight) | (A-1) | 40 | 60 | 80 | 45 | 65 | — |
| | (A-2) | — | — | — | — | — | 40 |
| (B) Matrix copolymer (parts by weight) | (B-1) | 54 | 36 | 12 | 22 | 20 | 54 |
| | (B-2) | 6 | 4 | 8 | 3 | 15 | 6 |
| | (B-3) | — | — | — | — | — | — |
| (C) Additive (parts by weight) | | 2.0 | 2.0 | 3.0 | 1.0 | 3.0 | 2.0 |
| Impact strength | | 7.10 | 9.80 | 15.00 | 8.20 | 10.20 | 13.30 |
| Hardness | | 103 | 87 | 68 | 94 | 85 | 105 |
| Elongation | | 83 | 105 | 171 | 85 | 110 | 112 |
| Weather resistance | | 0.52 | 0.60 | 0.79 | 0.69 | 0.61 | 1.67 |
| Scratch resistance | | ○ | ○ | ○ | ○ | ○ | ○ |
| Whitening resistance | | ○ | ○ | ○ | ○ | ○ | Δ |
| Surface gloss | | 125 | 118 | 105 | 124 | 119 | 98 |
| Appearance quality | | ○ | ○ | ○ | ○ | ○ | ○ |

TABLE 2

| Classification | | Comparative Examples | | | | | | |
|---|---|---|---|---|---|---|---|---|
| | | 1 | 2 | 3 | 4 | 5 | 6 | 7 |
| (A) Graft copolymer (parts by weight) | (A-1) | 50 | 90 | — | 65 | 60 | 60 | 60 |
| | (A-2) | — | — | 55 | — | — | — | — |
| (B) Matrix copolymer (parts by weight) | (B-1) | 25 | — | — | — | 36 | 40 | — |
| | (B-2) | 25 | 10 | — | — | 4 | — | 40 |
| | (B-3) | — | — | 45 | 35 | — | — | — |
| (C) Additive (parts by weight) | | — | 3.0 | — | 3.0 | — | 2.0 | 2.0 |
| Impact strength | | 8.70 | 20.10 | 35.40 | 13.20 | 11.60 | 11.20 | 6.50 |
| Hardness | | 95 | 50 | 79 | 63 | 78 | 91 | 82 |
| Elongation | | 58 | 121 | 83 | 31 | 95 | 38 | 35 |
| Weather resistance | | 1.68 | 2.35 | 13.75 | 10.96 | 2.24 | 0.58 | 0.63 |
| Scratch resistance | | x | Poorly processed | x | x | x | ○ | ○ |
| Whitening resistance | | ○ | | x | x | ○ | x | x |
| Surface gloss | | 80 | | 50 | 78 | 87 | 100 | 121 |
| Appearance quality | | ○ | | ○ | x | ○ | x | 0 |

Referring to Table 1 and Table 2, it was confirmed that Examples 1 to 6 were excellent in all of elongation, weather resistance, scratch resistance, surface gloss and appearance quality except that in the case of Example 6, which included a graft copolymer having a large particle diameter, a whitening phenomenon occurred. Meanwhile, as a result of comparing Example 2 and Comparative Example 5, it was confirmed that in the case of Comparative Example 5, which did not include the additive, there was a degradation in elongation, weather resistance, scratch resistance and surface gloss characteristics. As a result of comparing Example 2, Comparative Example 6 and Comparative Example 7, it was confirmed that in the case of Comparative Example 6, which did not include the second matrix copolymer, and Comparative Example 7, which did not include the first matrix copolymer, there was a significant degradation in elongation, weather resistance and appearance quality and a whitening phenomenon occurred. In addition, as a result of comparing Example 5 and Comparative Example 4, it was confirmed that in the case of Comparative Example 4, which did not include the first and second matrix copolymers, there was a significant degradation in elongation, weather resistance, scratch resistance, surface gloss and appearance quality and a whitening phenomenon occurred.

Meanwhile, in the case of Comparative Examples 1 and 3, there was a degradation in elongation, scratch resistance and surface gloss because the additive was not used. Due to the inclusion of an excessive amount of the graft copolymer having a small particle diameter and no first matrix copolymer, Comparative Example 2 yielded a test specimen that was obtained in a damaged state due to poor processing, and thus the properties thereof could not be evaluated.

The invention claimed is:

1. A thermoplastic resin composition comprising:
   a graft copolymer, which is prepared by graft-polymerizing an aromatic vinyl-based monomer and a vinyl cyan-based monomer onto an acrylic rubber polymer;
   a first matrix copolymer, which includes a $C_1$-$C_3$ alkyl (meth)acrylate-based monomer unit, an aromatic vinyl-based monomer unit and a vinyl cyan-based monomer unit;
   a second matrix copolymer, which includes a $C_1$-$C_3$ alkyl (meth)acrylate-based monomer unit, an aromatic vinyl-based monomer unit and a vinyl cyan-based monomer unit; and
   an additive, which includes a polymer including a $C_1$-$C_3$ alkyl (meth)acrylate-based monomer unit, wherein the first matrix copolymer and the second matrix copolymer have different weight-average molecular weights, and wherein the thermoplastic resin composition comprises, with respect to 100 parts by weight of the sum of the graft copolymer, the first matrix copolymer and the second matrix copolymer, the additive in an amount of 0.1 part by weight to less than 5.0 parts by weight.

2. The thermoplastic resin composition of claim 1, wherein the difference in weight-average molecular weight between the first matrix copolymer and the second matrix copolymer is 50,000 g/mol to 150,000 g/mol.

3. The thermoplastic resin composition of claim 1, wherein the first matrix copolymer has a weight-average molecular weight of 160,000 g/mol to 240,000 g/mol.

4. The thermoplastic resin composition of claim 1, wherein the second matrix copolymer has a weight-average molecular weight of 60,000 g/mol to 140,000 g/mol.

5. The thermoplastic resin composition of claim 1, wherein the thermoplastic resin composition includes the first matrix copolymer and the second matrix copolymer in a weight ratio of 55:45 to 95:5.

6. The thermoplastic resin composition of claim 1, wherein the acrylic rubber polymer of the graft copolymer has an average particle diameter of 40.0 nm to 400.0 nm.

7. The thermoplastic resin composition of claim 1, wherein the acrylic rubber polymer of the graft copolymer has an average particle diameter of 40.0 nm to 100.0 nm.

8. The thermoplastic resin composition of claim 1, wherein the acrylic rubber polymer of the graft copolymer has an average particle diameter of 150.0 nm to 400.0 nm.

9. The thermoplastic resin composition of claim 1, wherein the polymer is a copolymer that includes two or more types of $C_1$-$C_3$ alkyl (meth)acrylate-based monomer units.

10. The thermoplastic resin composition of claim 1, wherein the polymer has a weight-average molecular weight of 30,000 g/mol to 90,000 g/mol.

11. The thermoplastic resin composition of claim 1, comprising, with respect to 100 parts by weight of the sum of the graft copolymer, the first matrix copolymer and the second matrix copolymer:
   the graft copolymer in an amount of 30 parts by weight to 90 parts by weight;
   the first matrix copolymer in an amount of 1 part by weight to 65 parts by weight; and
   the second matrix copolymer in an amount of 1 part by weight to 25 parts by weight.

12. The thermoplastic resin composition of claim 1, wherein thermoplastic resin composition comprises the additive in an amount of 0.1 to 3.0 parts by weight.

13. The thermoplastic resin composition of claim 1, wherein thermoplastic resin composition comprises the additive in an amount of 1.0 to 3.0 parts by weight.

* * * * *